US009141821B2

(12) United States Patent
Goodman et al.

(10) Patent No.: US 9,141,821 B2
(45) Date of Patent: *Sep. 22, 2015

(54) SELECTIVE ENCRYPTION OF DATA STORED ON REMOVABLE MEDIA IN AN AUTOMATED DATA STORAGE LIBRARY

(75) Inventors: Brian Gerard Goodman, Tucson, AZ (US); James Arthur Fisher, Tucson, AZ (US); Leonard George Jesionowski, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 288 days.

This patent is subject to a terminal disclaimer.

(21) Appl. No.: 13/464,225

(22) Filed: May 4, 2012

(65) Prior Publication Data
US 2012/0239944 A1 Sep. 20, 2012

Related U.S. Application Data

(63) Continuation of application No. 11/470,670, filed on Sep. 7, 2006, now Pat. No. 8,230,235.

(51) Int. Cl.
*G06F 21/00* (2013.01)
*G06F 21/62* (2013.01)
*G06F 21/80* (2013.01)

(52) U.S. Cl.
CPC .......... *G06F 21/6218* (2013.01); *G06F 21/805* (2013.01); *G06F 2221/2121* (2013.01)

(58) Field of Classification Search
CPC .............. G06F 21/6218; G06F 21/805; G06F 2221/2121

USPC ......................................................... 713/193
See application file for complete search history.

(56) References Cited

U.S. PATENT DOCUMENTS 5,748,738 A 5/1998 Bisbee
6,128,735 A 10/2000 Goldstein et al.
(Continued)

FOREIGN PATENT DOCUMENTS

WO 2005/114371 A3 5/2006

OTHER PUBLICATIONS

Molnar et al.; Privacy and security in library RFID: issues, practices, and architectures; Published in: Proceeding CCS '04 Proceedings of the 11th ACM conference on Computer and communications security; 2004; pp. 210-219; ACM Digital Library.*

(Continued)

*Primary Examiner* — Bradley Holder
(74) *Attorney, Agent, or Firm* — Griffiths & Seaton PLLC

(57) ABSTRACT

In an automated data storage library, selective encryption for data stored or to be stored on removable media is provided. One or more encryption policies are established, each policy including a level of encryption, one or more encryption keys and the identity of one or more data cartridges. The encryption policies are stored in a policy table and the encryption keys are stored in a secure key server. A host requests access to a specified data cartridge and the cartridge is transported from a storage shelf in the library to a storage drive. Based on the identity of the specified cartridge, the corresponding encryption policy is selected from the table and the appropriate encryption key is obtained from the key server. The storage drive encrypts data in accordance with the key and stores the data on the media within the specified data cartridge.

6 Claims, 10 Drawing Sheets

(56) References Cited

U.S. PATENT DOCUMENTS

| | | | |
|---|---|---|---|
| 6,240,183 B1 | 5/2001 | Merchant | |
| 6,490,680 B1 | 12/2002 | Scheidt et al. | |
| 6,766,412 B2 | 7/2004 | Bolt | |
| 6,931,532 B1 * | 8/2005 | Davis et al. | 713/167 |
| 7,240,197 B1 * | 7/2007 | Yamagami et al. | 713/168 |
| 7,277,941 B2 * | 10/2007 | Ignatius et al. | 709/225 |
| 7,353,399 B2 * | 4/2008 | Ooi et al. | 713/186 |
| 7,487,323 B2 | 2/2009 | Saliba | |
| 7,493,494 B2 | 2/2009 | Bondurant | |
| 7,533,256 B2 * | 5/2009 | Walter et al. | 713/153 |
| 7,613,752 B2 | 11/2009 | Prahlad et al. | |
| 7,681,048 B2 * | 3/2010 | Starr et al. | 713/193 |
| 7,925,918 B2 | 4/2011 | Settle et al. | |
| 7,991,288 B1 * | 8/2011 | Uhlhorn | 398/78 |
| 8,255,704 B1 * | 8/2012 | Joh | 713/193 |
| 2001/0017817 A1 | 8/2001 | De LaHuerga | |
| 2003/0041267 A1 | 2/2003 | Fee et al. | |
| 2003/0074319 A1 | 4/2003 | Jaquette | |
| 2003/0105830 A1 | 6/2003 | Pham et al. | |
| 2003/0126362 A1 | 7/2003 | Camble et al. | |
| 2003/0193887 A1 | 10/2003 | Tajima et al. | |
| 2004/0025031 A1 * | 2/2004 | Ooi et al. | 713/186 |
| 2004/0085955 A1 * | 5/2004 | Walter et al. | 370/386 |
| 2004/0168049 A1 | 8/2004 | Lee | |
| 2005/0198412 A1 | 9/2005 | Pedersen et al. | |
| 2005/0213440 A1 | 9/2005 | Goodman et al. | |
| 2006/0123250 A1 | 6/2006 | Maheshwari et al. | |
| 2007/0016742 A1 | 1/2007 | Goodman et al. | |
| 2007/0022145 A1 | 1/2007 | Kavuri | |
| 2007/0038827 A1 | 2/2007 | Inooka | |
| 2007/0043958 A1 * | 2/2007 | Sasaki | 713/194 |
| 2007/0083759 A1 * | 4/2007 | Drew et al. | 713/168 |
| 2007/0160200 A1 | 7/2007 | Ishikawa et al. | |
| 2007/0168664 A1 | 7/2007 | Goodman et al. | |
| 2007/0195447 A1 * | 8/2007 | Starr et al. | 360/72.1 |
| 2007/0260891 A1 * | 11/2007 | Starr et al. | 713/193 |
| 2008/0066193 A1 | 3/2008 | Hahn et al. | |
| 2008/0219449 A1 | 9/2008 | Ball et al. | |

OTHER PUBLICATIONS

Seitz et al.; Key Management for Encrypted Data Storage in Distributed Systems; Published in: Security in Storage Workshop, 2003. SISW '03. Proceedings of the Second IEEE International Date of Conference: Oct. 31-31, 2003; p. 20; IEEE Xplore.*

Savage, Shirley: "Encrypting Tape Storage;" IBM Systems Magazine, Mainframe Edition, Online], Jul. 2006-Aug. 2006; XP002478516; USA; Retrieved from the internet Apr. 28, 2008: http://www.ibmsystemsmag.com/print/print.aspx?print_page=/mainframe/julyaugust06/focusonstorage/9814p1.aspx.

* cited by examiner

SELECTIVE ENCRYPTION OF DATA STORED ON REMOVABLE MEDIA IN AN AUTOMATED DATA STORAGE LIBRARY

RELATED APPLICATION DATA

The present application is a continuation application of, and claims the priority benefit of, commonly-assigned and co-pending U.S. application Ser. No. 11/470,670, entitled CARTRIDGE ENCRYPTION POLICY FOR AN AUTOMATED DATA STORAGE LIBRARY and filed on Sep. 7, 2006, which application is incorporated herein by reference in its entirety.

The present application is also related to commonly-assigned U.S. application Ser. No. 11/470,678, entitled VALIDATION OF THE IDENTITY OF A REMOVABLE MEDIA VOLUME MOUNTED IN AN AUTOMATED DATA STORAGE LIBRARY, which application is incorporated herein by reference in its entirety.

FIELD OF THE INVENTION

This invention relates to automated data storage libraries, and more particularly, to the encryption of data stored or to be stored on removable media.

BACKGROUND OF THE INVENTION

Automated data storage libraries are known for providing cost effective storage and retrieval of large quantities of data. The data in automated data storage libraries is stored on data storage media that are, in turn, stored on storage shelves or the like inside the library in a fashion that renders the media, and its resident data, accessible for physical retrieval. Such media is commonly termed "removable media." Data storage media may comprise any type of media on which data may be stored and which may serve as removable media, including but not limited to magnetic media (such as magnetic tape or disks), optical media (such as optical tape or disks), holographic media (such as holographic tape or disks), electronic media (such as PROM, EEPROM, flash PROM, MRAM, Compactflash ™, Smartmedia ™, Memory Stick ™, etc.), or other suitable media. Typically, the data stored in automated data storage libraries is resident on data storage media that is contained within a cartridge and referred to as a data storage media cartridge. An example of a data storage media cartridge that is widely employed in automated data storage libraries for mass data storage is a magnetic tape cartridge.

In addition to data storage media, automated data storage libraries typically contain one or more data storage drives that store data to, and/or retrieve data from, the data storage media. Transporting data storage media between data storage shelves and data storage drives is typically accomplished by one or more robot accessors (hereinafter termed "accessors"). Such accessors have grippers for physically retrieving the selected data storage media from the storage shelves within the automated data storage library and transport such media to the data storage drives by moving in the X and/or Y directions.

In many applications, it is important to ensure that data stored on removable media is secure. In addition to the inconvenience and expense of having to replicate, reconstruct or re-obtain data lost to theft, accidents, etc., there can be tremendous fallout, including legal liability, if confidential information is misappropriated. However, it may not be necessary to secure all data or to secure all data to the same level. Consequently, a need exists for a system and method for selectively securing data, such as stored on removable media in automated storage libraries, which is reliable, is sufficiently flexible to permit data on different data cartridges to be secured at different levels (or to remain unsecure) and does not adversely affect performance of the library or any of its components.

SUMMARY OF THE INVENTION

The present invention provides a data storage drive within a data storage library. The drive includes a user interface through which to receive a user input of one or more encryption policies and one or more cartridge identifiers to be associated with each encryption policy, a library-drive interface through which to receive one or more encryption policies and associated cartridge identifiers from a library controller associated with the library, means for obtaining a cartridge identifier of a data cartridge loaded into the storage drive and means for matching the identifier with an associated encryption policy. The library-drive interface is further operable to transmit a request to a key server for an encryption key in response to matching the cartridge identifier with a corresponding encryption policy and to receive the requested encryption key. The drive further includes an encryption module to encrypt data being written to the loaded data cartridge.

DETAILED DESCRIPTION OF THE INVENTION

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

The invention will be described as embodied in an automated magnetic tape library storage system for use in a data processing environment. Although the invention shown uses magnetic tape cartridges, one skilled in the art will recognize the invention equally applies to optical disk cartridges or other removable storage media (as described herein) and the use of either different types of cartridges or cartridges of the same type having different characteristics. Furthermore the description of an automated magnetic tape storage system is not meant to limit the invention to magnetic tape data processing applications as the invention herein can be applied to any media storage and cartridge handling systems in general.

Figure 1:
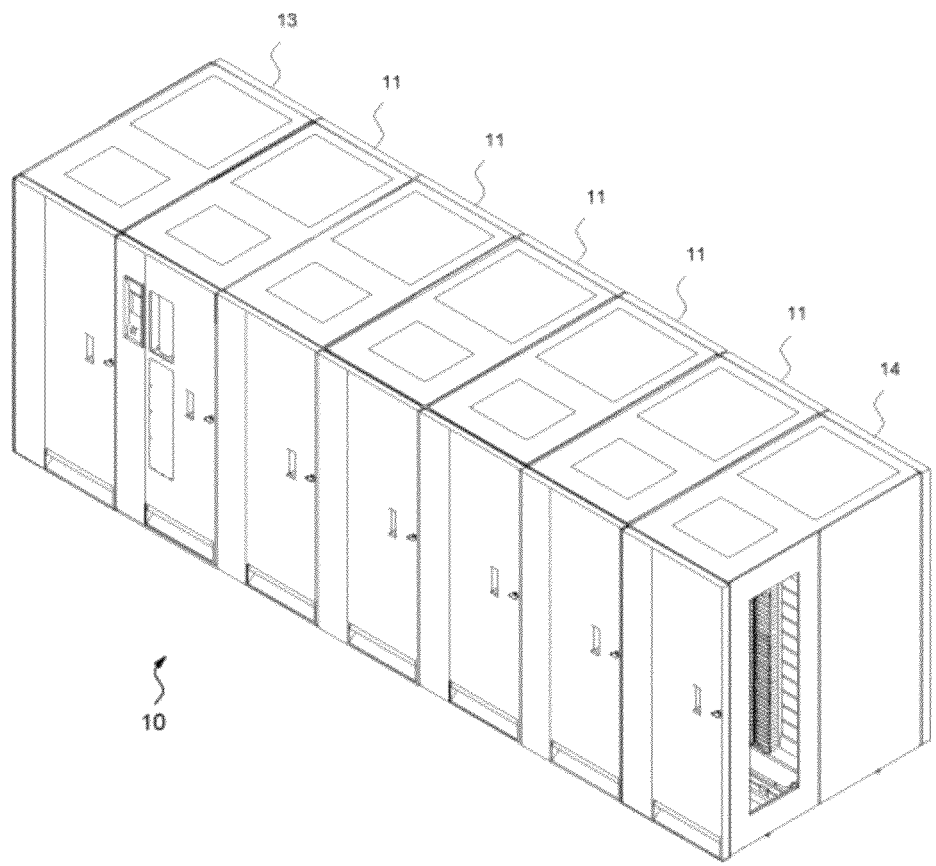
FIG. 1 is an isometric view of an automated data storage library adaptable to implement an embodiment of the present invention, with the view specifically depicting a library having a left hand service bay, multiple storage frames and a right hand service bay.
Figure 2:
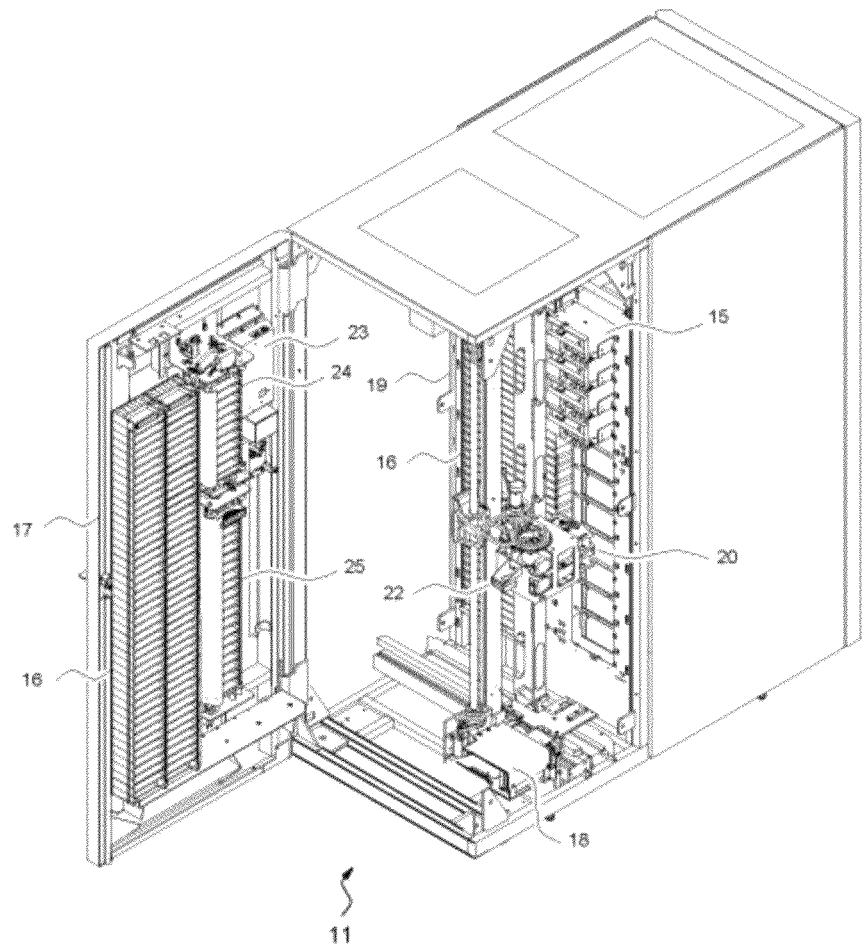
FIG. 2 is an isometric view of an automated data storage library adaptable to implement an embodiment of the present invention, with the view specifically depicting an exemplary basic configuration of the internal components of a library.

Turning now to the Figures, FIGS. 1 and 2 illustrate an automated data storage library 10 which stores and retrieves data storage cartridges containing data storage media (not shown) in storage shelves 16. It is noted that references to "data storage media" herein refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library of FIG. 1 comprises a left hand service bay 13, one or more storage frames 11, and right hand service bay 14. As will be discussed, a frame may comprise an expansion component of the library. Frames may be added or removed to expand or reduce the size and/or functionality of the library. Frames may comprise additional storage shelves, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage shelves 16, one front wall 17 and rear wall 19 for storing data storage cartridges that contain data storage media; at least one data storage drive 15 for reading and/or writing data with respect to the data storage media; and a first accessor 18 for transporting the data storage media between the plurality of storage shelves 16 and the data storage drive(s) 15. The data storage drives 15 may be optical disk drives or magnetic tape drives, or other types of data storage drives as are used to read and/or write data with respect to the data storage media. The storage frame 11 may optionally comprise an operator panel 23 or other user interface, such as a web-based interface, which allows a user to interact with the library. The storage frame 11 may optionally comprise an upper I/O station 24 and/or a lower I/O station 25, which allows data storage media to be inserted into the library and/or removed from the library without disrupting library operation. As used herein, "storage cell" refers to any location within a library that may hold a data storage cartridge, such as but without limitation, storage shelves 16, the storage shelves of an I/O station 24-25, or the media slot of a drive 15. The library 10 may comprise one or more storage frames 11, each having storage shelves 16 accessible by first accessor 18.

As described above, the storage frames 11 may be configured with different components depending upon the intended function. One configuration of storage frame 11 may comprise storage shelves 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
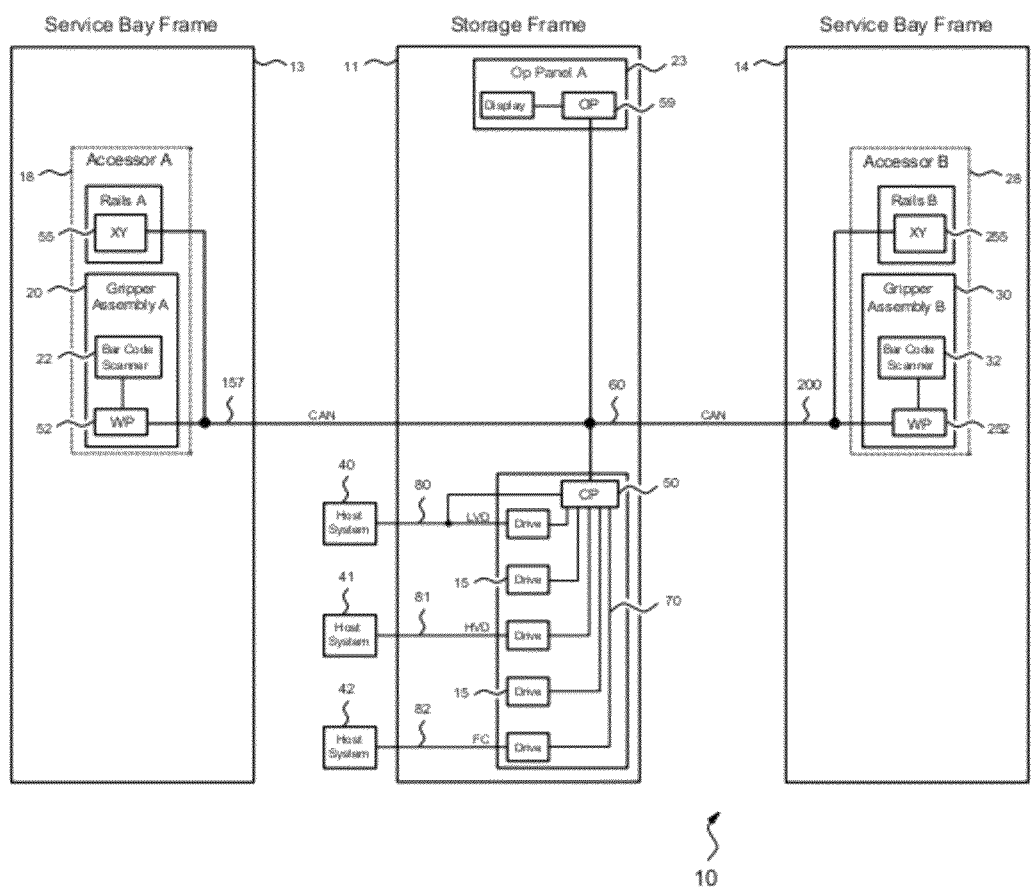
FIG. 3 is a block diagram of an automated data storage library adaptable to implement an embodiment of the present invention, with the diagram specifically depicting a library that employs a distributed system of modules with a plurality of processor nodes.

FIG. 3 illustrates an embodiment of an automated data storage library 10 of FIGS. 1 and 2, which employs a distributed system of modules with a plurality of processor nodes. An example of an automated data storage library which may implement the distributed system depicted in the block diagram of FIG. 3, and which implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein for reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may have a common horizontal rail with independent vertical rails. The first accessor 18 and the second accessor 28 are described as first and second for descriptive purposes only and this description is not meant to limit either accessor to an association with either the left hand service bay 13, or the right hand service bay 14.

In the exemplary library, first accessor 18 and second accessor 28 move their grippers in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The exemplary library is controlled by a distributed control system receiving the logical commands from hosts, determining the required actions, and converting the actions to physical movements of first accessor 18 and/or second accessor 28.

In the exemplary library, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives and with host systems 40, 41 and 42. Alternatively, the host systems may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network. Interface 70, 80, 81 and/or 82 may comprise serial, parallel, or optical interfaces such as but not limited to RS-232, USB (Universal Serial Bus), serial or parallel ATA (AT Attachment), SCSI (Small Computers System Interface), SAS (Serial Attached SCSI), Fibre Channel, IEEE 1394 (FireWire or Think), IEEE 1284 (parallel port), etc. In addition, interface 70, 80, 81 and/or 82 may comprise network or wireless interfaces such as but not limited to Ethernet, CAN (Controller Area Network), 802.11 (Wi-Fi), X.25 (WAN), Bluetooth, etc.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. A second accessor 28, for example, is shown in a right hand service bay 14 of FIG. 3. The second accessor 28 may comprise a gripper 30 for accessing the data storage media, and an XY system 255 for moving the second accessor 28. The second accessor 28 may run on the same horizontal mechanical path as first accessor 18, or on an adjacent path. The exemplary control system additionally comprises an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, network 157 may not be associated with the left hand service bay 13 and network 200 may not be associated with the right hand service bay 14. Depending on the design of the library, it may not be necessary to have a left hand service bay 13 and/or a right hand service bay 14.

Figure 4:
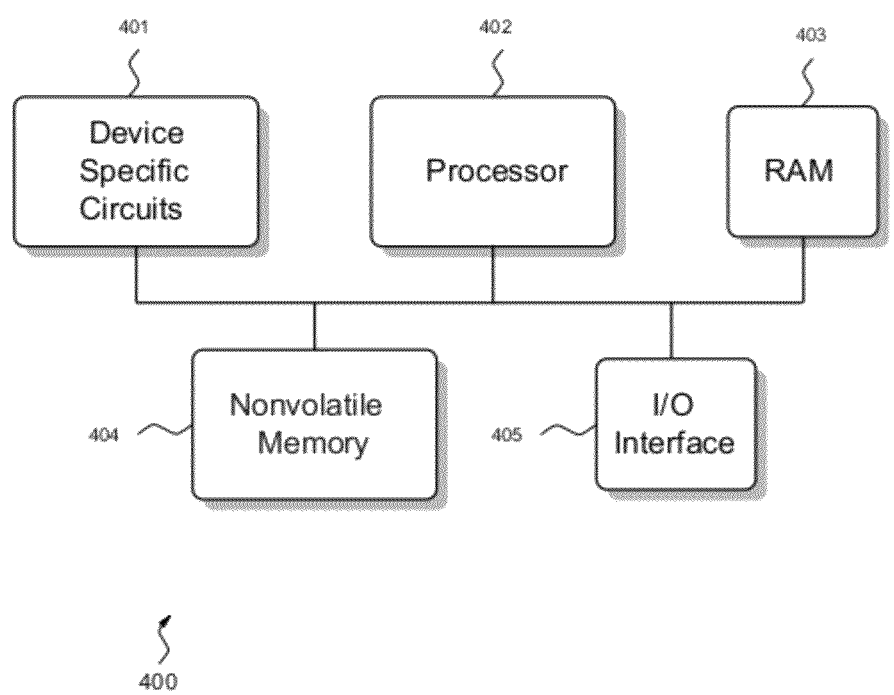
FIG. 4 is a block diagram depicting an exemplary controller configuration.

An automated data storage library 10 typically comprises one or more controllers to direct the operation of the automated data storage library. Host computers and data storage drives typically comprise similar controllers. A controller may take many different forms and may comprise, for example but not limited to, an embedded system, a distributed control system, a personal computer, or a workstation. Essentially, the term "controller" as used herein is intended in its broadest sense as a device that contains at least one processor, as such term is defined herein. FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, PROM (Programmable Read Only Memory), EEPROM (Electrically Erasable Programmable Read Only Memory), flash PROM (Programmable Read Only Memory), NVRAM (Non-Volatile Random Access Memory), MRAM (Magnetoresistive Random Access Memory), battery backup RAM, CD (Compact Disk), DVD (Digital Versatile Disk), hard disk drives, etc. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial, parallel, or optical interfaces such as RS-232, USB (Universal Serial Bus), serial or parallel ATA (AT Attachment), SCSI (Small Computers System Interface), SAS (Serial Attached SCSI), Fibre Channel, IEEE 1394 (FireWire or Think), IEEE 1284 (parallel port), etc. In addition, I/O interface 405 may comprise, but are not limited to network or wireless interfaces such as Ethernet, CAN (Controller Area Network), 802.11 (Wi-Fi), X.25 (WAN), Bluetooth, etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the present invention may be implemented in various automated data storage libraries regardless of control configuration, such as, but not limited to, an automated data storage library having one or more library controllers that are not distributed. A library controller may comprise one or more dedicated controllers of a prior art library. For example, there may be a primary controller and a backup controller. In addition, a library controller may comprise one or more processor nodes of a distributed control system. For example, communication processor node 50 (FIG. 3) may comprise the library controller while the other processor nodes (if present) may assist the library controller and/or may provide backup or redundant functionality. In another example, communication processor node 50 and work processor node 52 may work cooperatively to comprise the library controller while the other processor nodes (if present) may assist the library controller and/or may provide backup or redundant functionality. Still further, all of the processor nodes may comprise the library controller. Herein, library controller may comprise a single processor or controller or it may comprise multiple processors or controllers.

Figure 5:
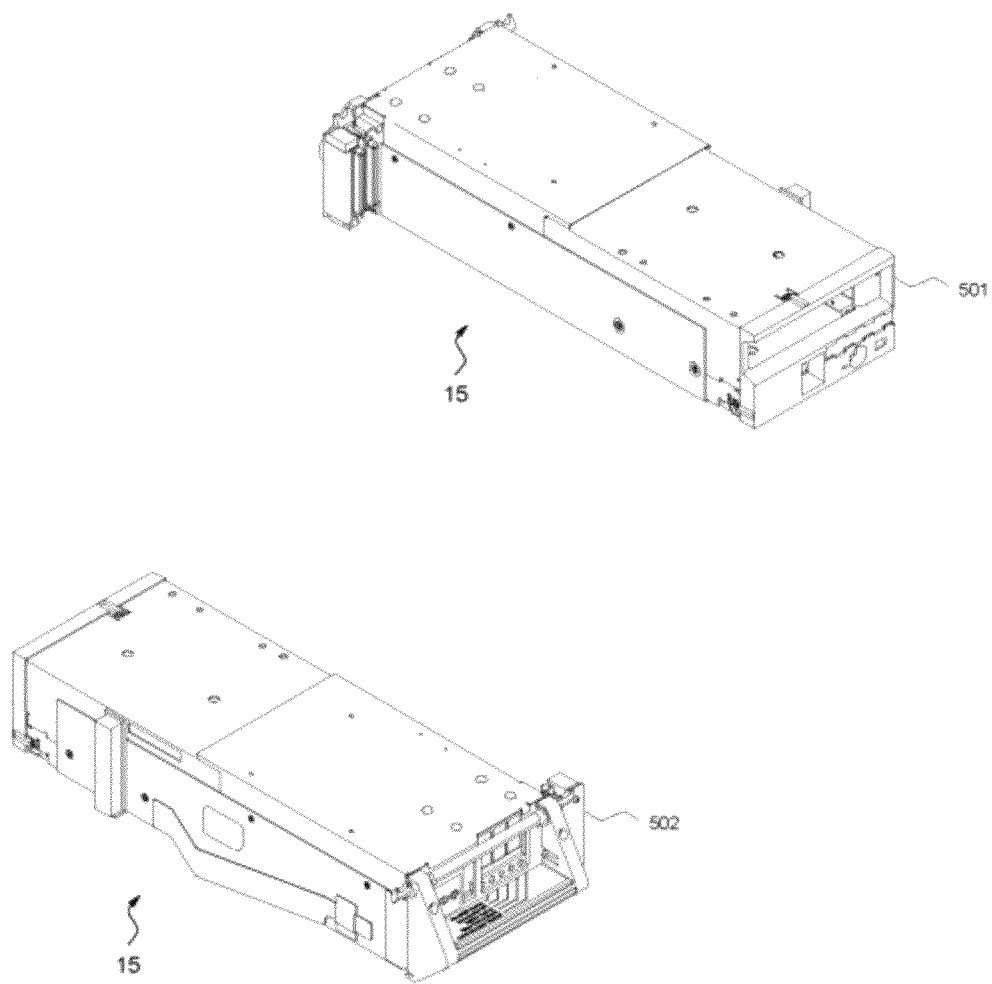
FIG. 5 is an isometric view of the front and rear of a data storage drive adaptable to implement an embodiment of the present invention.

FIG. 5 illustrates an embodiment of the front 501 and rear 502 of a data storage drive 15. In the example of FIG. 5, the data storage drive 15 comprises a hot-swap drive canister. This is only an example and is not meant to limit the invention to hot-swap drive canisters. In fact, any configuration of data storage drive may be used whether or not it comprises a hot-swap canister.

Figure 6A:
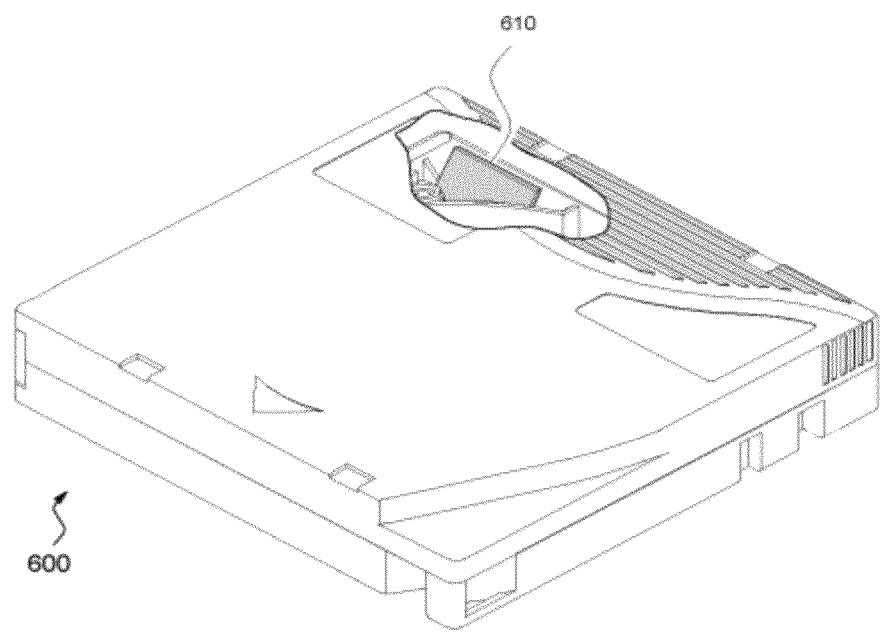
FIGS. 6A-6E are isometric views of data storage cartridges illustrating a variety of cartridge identifiers which may be used in the present invention.

FIG. 6A illustrates an embodiment of a data storage cartridge 600 with a cartridge memory 610 shown in a cutaway portion of the Figure. The cartridge memory 610 may comprise electrical contacts to allow the library and/or data storage drive to access the contents of the cartridge memory. Alternatively, the cartridge memory may comprise a contactless interface such as induction, radio frequency, or optical. In one embodiment, the cartridge memory comprises an RFID tag. Among other information, the cartridge memory 610 may store a value representative of an identification of the cartridge. The cartridge identification may alternatively be stored on an external machine-readable label 612 affixed to the cartridge 600 (FIG. 6B), an external human-readable label 614 affixed to the cartridge 600 (FIG. 6C), a radio frequency identification (RFID) tag 616 affixed to the cartridge 600 (FIG. 6D), stored on the media itself 618 (FIG. 6E), or combinations thereof. The identifiers of FIGS. 6A-6D may be affixed to the cartridge, glued or fastened on or in the cartridge, painted on or etched into the cartridge, placed in the cartridge, manufactured on or in the cartridge, integrated into the cartridge, etc. Herein, affixed may refer to any method of combining an identifier with a cartridge.

Figure 7:
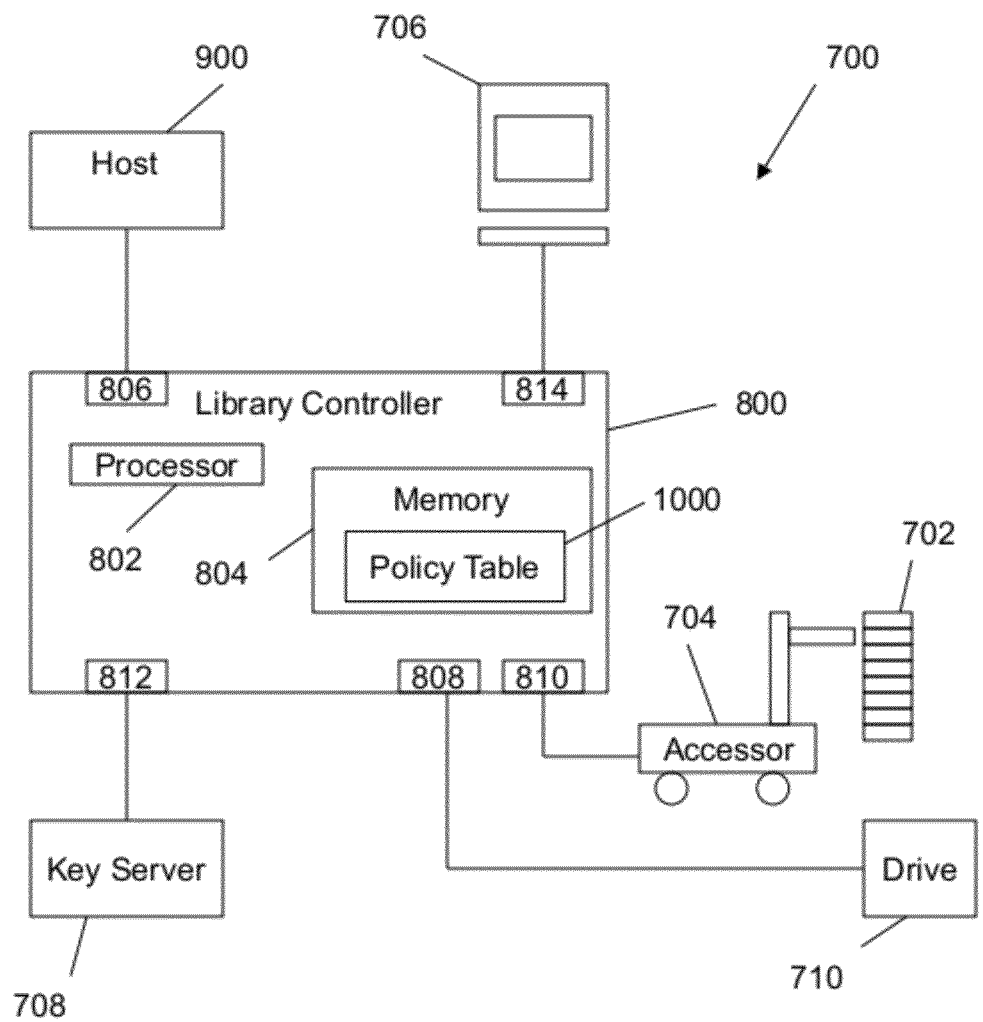
FIG. 7 is a block diagram of an automated data storage library, including one embodiment of a library controller and a dedicated key server, in which the encryption system may be implemented.

FIG. 7 is another block diagram of an automated data storage library 700 attached to one or more hosts 900, and one or more key servers 708, as will be described below. The library 700 includes a library controller 800, shelves 702, in which removable media cartridges may be stored, one or more data storage drives 710, and a robotic cartridge accessor 704 which, under the direction or control of the library controller 800, transports cartridges between the storage shelves 702 and the drive(s) 710. The library 700 may further include a user interface 706 such as an operator panel, a touch screen, a keyboard and/or display, a remote computer, web user interface, etc.

The library controller 800 includes a processor 802 operable to execute instructions stored in a memory 804. The controller 800 further includes a host interface 806, a drive interface 808, an accessor interface 810, a key server interface 812 and a console interface 814. The drive 710 may comprise a host interface (not shown). The drive interface 808 may also comprise a host interface to the library (as described above), and there may not be a host interface 806. The connection between the controller 800 and the drive 710 via the drive interface 808 may employ a proprietary library-drive interface (LDI) protocol, may comprise the industry standard SCSI T10 ADI (Automation Drive Interface) library-drive interface, or may comprise any library-drive interface as is known in the trade. As used herein, "library-drive interface" may refer to any interface between the library and drive.

Figure 8:
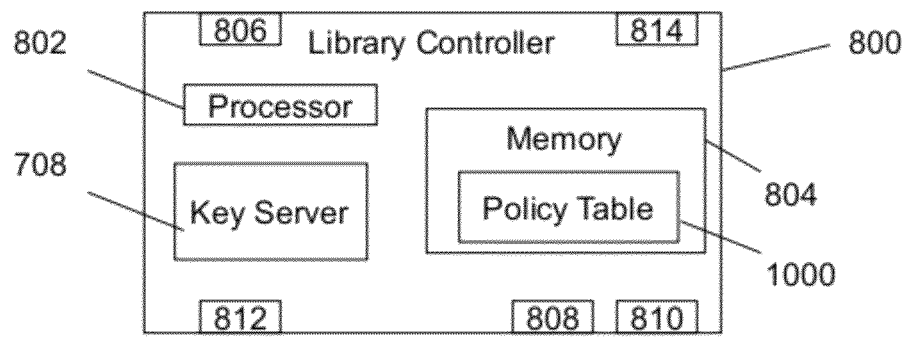
FIG. 8 is a block diagram of an embodiment of a library controller in which the key server is incorporated.
Figure 9:
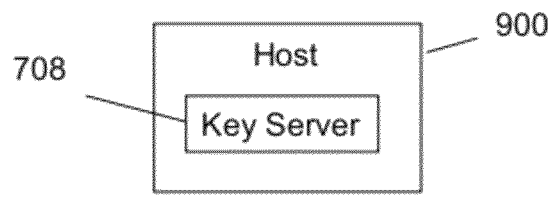
FIG. 9 is a block diagram of a host device in which the key server is incorporated.

Encryption keys are stored in the key server 708, or in a key store coupled to the key server, in a secure manner. As used herein, "key server" may additionally refer to any key stores associated with the key server. A key store may comprise a software element such as an array, structure, database, file, etc. In addition, a key store may comprise a hardware element such as memory, media, a hard drive, storage device, etc. The key server 708 may be a dedicated PC or server (as illustrated in FIG. 7) and may be coupled to the controller 800 by any known means, such as, but not limited to, serial, parallel, or optical interfaces such as RS-232, USB (Universal Serial Bus), serial or parallel ATA (AT Attachment), SCSI (Small Computers System Interface), SAS (Serial Attached SCSI), Fibre Channel, IEEE 1394 (FireWire or Think), IEEE 1284 (parallel port), etc. In addition, I/O interface 405 may comprise, but are not limited to network or wireless interfaces such as Ethernet, CAN (Controller Area Network), 802.11 (Wi-Fi), X.25 (WAN), Bluetooth, etc. In one example, the key server is coupled to the controller 800 with an Ethernet network employing TCP/IP. The key server 708 may also be integrated into the library controller (FIG. 8) or the host (FIG. 9). In this case, the coupling between the key server and the library controller 800, or between the key server and the host 900, may comprise a logical coupling with no physical interface.

Figure 6B:
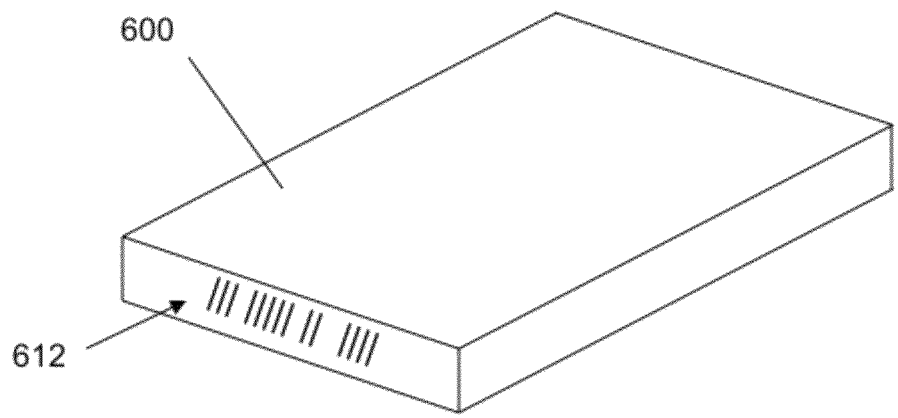
Figure 6C:
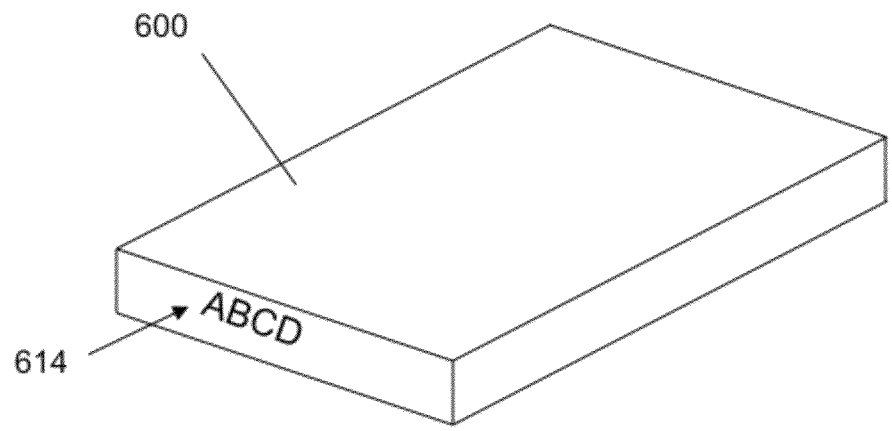
Figure 6D:
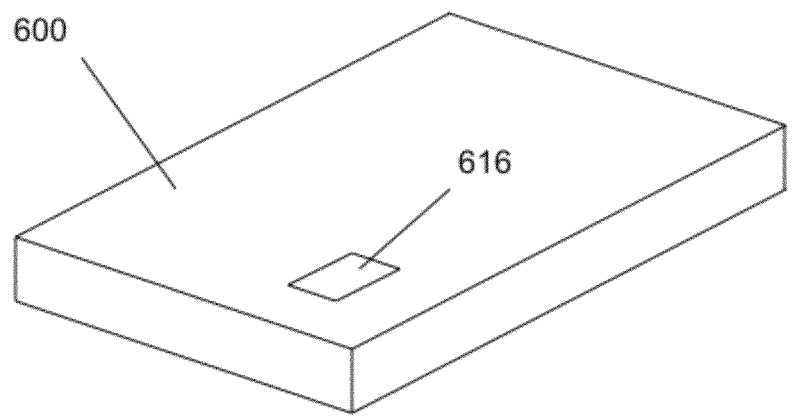
Figure 6E:
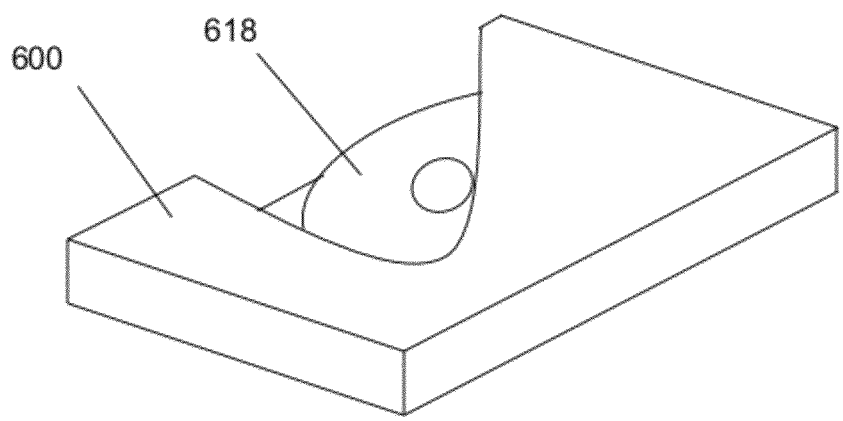

A library user or administrator establishes one or more encryption policies. For each policy, the administrator will select one of several levels of encryption, including no encryption, using one encryption key, using two encryption keys, etc. For each encryption policy, the administrator will also select one or more encryption keys (depending on the level of security chosen). Finally, for each encryption policy, the administrator will select one or more data cartridges to associate with the policy. The cartridges are preferably identified by their respective cartridge identifiers as illustrated in FIGS. 6A-6E. As an additional level of assurance, a policy may require that a cartridge be identified by more than one identifier, such as a value stored in a cartridge memory (FIG. 6A) and on an external bar code label (FIG. 6B). Other combinations of identifiers may also be used. When the labels are read, and the policy requires more than one identifier to confirm the cartridge identity, the identification of the cartridge is confirmed only if the two labels match the identification of the policy. The administrator may enter identifiers to be associated with an encryption policy as individual values or as a range of identifier values, or a combination of both. Alternatively, the encryption policy may be stored with the cartridge. In this case, the identifier need not be physically stored with the encryption policy, but instead is implied to be part of the policy. For example, a cartridge that has a policy stored with it may also have a cartridge identifier that a host application uses to identify the particular cartridge from other cartridges. Therefore, the identification does not need to be stored with the policy of the cartridge because the cartridge already contains an identification. Thus, in accordance with the present invention, it will be possible to select which cartridges will have their data encrypted, and to what level, and which cartridges will have unencrypted data.

Additionally, different encryption policies may be established for different users, thereby restricting access to specified data to only those who have a need for such access. For example, certain employees of a bank may need to access stored check images but would not need to access personal customer information. Thus, a policy for such employees might include an encryption key which is different from the encryption key assigned to a policy for those higher level employees who do need to access personal customer information.

In another variation, certain encryption policies may be assigned to specific storage drives or logical libraries that contain the drives. Libraries commonly provide logical partitions or logical libraries. It is desirable to isolate one logical library from another logical library such that they appear to the attached host systems as completely separate physical libraries. This allows different host systems and/or host application to share the same physical library. It is important that the data from one logical library is not inadvertently presented to another logical library because this could result in a security breach of the data. In addition, it could result in a loss of data because a host application may erase the data on a cartridge that it does not recognize. By assigning different encryption policies to different logical libraries, or the drives within the logical libraries, the risk of inadvertent access to the wrong data cartridge is further reduced because the host computers associated with one logical library may not have access to the encryption key of another logical library. In still a further variation, each drive may be assigned a default policy or key, and/or a global default policy or key may be assigned to all drives. A default key for a particular drive allows media in the drive to be encrypted with the default drive key, in the event the encryption policy does not specify a particular key. This can be useful to eliminate the need to specify a common key each time a policy is created. In addition, a global default key allows media in any drive to be encrypted with the global default key, in the event there is no drive specific default key and the encryption policy does not specify a particular key. The default key and/or the default global key may be specified by, or configured in, the library or the key server.

Figure 10:
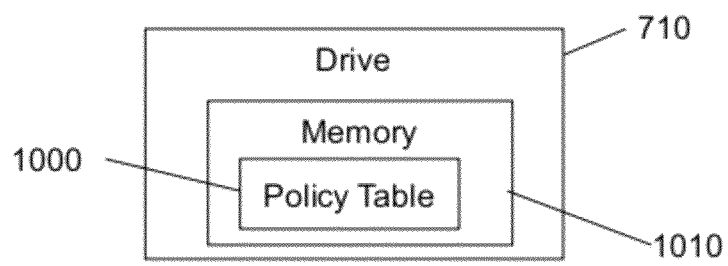
FIG. 10 is a block diagram of a storage drive in which encryption policies are stored.

After the encryption policies have been entered, they may be stored in an encryption policy table, such as a table 1000 stored in the memory 804 of the library controller 800 (FIG. 7). Alternatively, the table 1000 may be transmitted by the controller 800 to, and stored in, a memory device 1010 in the storage drive 700 (FIG. 10). Still further, the encryption policy table may comprise one or more policies for a cartridge, and it may be stored with the cartridge to which the policy applies. As a result, each cartridge may have its own encryption policy table. For example, the policy for a particular cartridge may be stored in cartridge memory 610 of cartridge 600 in FIG. 6A, or it may be stored in RFID tag 616 of cartridge 600 in FIG. 6D. In another example, the policy for a particular cartridge may be stored in the media 618 of cartridge 600 in FIG. 6E. Still further, the policy for a particular cartridge may be specified by a machine readable label on the outside of the cartridge 612 in FIG. 6B or 614 in FIG. 6C.

In operation, the host 900 transmits a request to the library controller 800 to access a specified cartridge. The library controller 800 either directly controls, or transmits a command to, the accessor 704 to transport the cartridge from a storage shelve 702 to the drive 710. The accessor 704 may have a reader (such as a bar code reader, a camera, an RFID reader, etc.) with which to read or otherwise obtain one or more cartridge identifiers from the cartridge before, during, or after it is moved from the storage shelf 702 to verify the identity of the cartridge. The cartridge identifier may be read prior to moving the cartridge. For example, libraries typically maintain an inventory of cartridges, their identifiers, and their location within the library. The inventory may be used to verify the identity of the cartridge before it is moved. In another example, the cartridge identifier may be read just prior to moving the cartridge from the storage shelve 702 to confirm the identity of the cartridge with a higher degree of certainty. Alternatively, the cartridge identifier may be read while moving the cartridge. For example, the library controller 800 may have the ability to read the cartridge identifier while it is in the gripper of the library accessor. Still further, the cartridge identifier may be read after it has been moved to the drive 710. For example, the library may confirm the cartridge identity after it has been moved to the drive. In another example, the library controller 800 may use the drive to read a cartridge identifier. It will be appreciated that, if an identifier is stored on the media within the specified cartridge, the cartridge may have to be loaded into the drive 710 before the identifier can be read. It will also be appreciated that one or more readers may be associated with the drive 710 instead of, or in addition to, any readers that may be associated with the accessor 704. For example, the drive 710 may comprise a cartridge memory reader and the library 800 may not.

In one embodiment of the present invention, in which the encryption policy table 1000 is stored in the library controller (FIG. 7), the cartridge identifier information is read by, or transmitted to, the library controller 800. The controller 800 compares the identifier to identifiers in the table 1000 and, if it finds a match, initiates communications with either the drive 710 or the key sever 708 to provide the encryption key(s) required by the appropriate encryption policy to the drive 710. If the initiated communication is to the drive, it may be in the form of a key identifier for the required key, or it may be a signal to the drive that encryption is required. The drive may then use this identifier or signal to request a key. Alternatively, the communication to the drive may be in the form of policy information, such as the cartridge identifier. The drive may compare the cartridge identifier supplied by the library, to the cartridge identifier obtained by the drive, to determine what key (if any) to request. If the initiated communication is to the key server, it may be in the form of a key request. In this embodiment, the communications between the drive 710 and the key server 708 may go through the library controller 800, serving as the key server 708, or as a proxy for the key server 708. A library proxy for the key server refers to the fact that the library provides a path or vehicle for establishing communication between the drive and the key server. For example, the library/drive interface may comprise the SCSI T10 Automation Drive Interface (ADI) over RS-422. The key server interface may comprise a TCP/IP interface over Ethernet. As a proxy, the library may provide the protocol conversion between the drive ADI protocol and the key server TCP/IP protocol. In addition, the library may provide more functionality than just protocol conversion. For example, the drive key request to the library may comprise a different request than the key request from the library to the key server. In other words, the command and data information may be completely different between the drive and key server such that simple protocol conversion is not sufficient to bridge the communication. Alternatively, the communications between the drive 710 and the key server 708 may go through a host computer device driver, operating system, file system or some other software on the host computer. For example, a device driver on the host computer may be a proxy between the drive and the key server. After the drive 710 has received the key(s), it may then encrypt data being written to the media within the specified cartridge in accordance with the key(s).

In an alternate embodiment, in which the encryption policy table 1000 is stored in the drive (FIG. 10), the drive 710 reads the identifier and/or receives the identifier from the library controller and compares the identifier to identifiers in the table 1000 and, if it finds a match, requests the key sever 708 to provide the encryption key(s) required by the appropriate encryption policy to the drive 710. The key server 708 transmits the requested key back to the drive 710. In this embodiment, the communications between the drive 710 and the key server 708 may go through the library controller 800, serving as the key server 708, or as a proxy for the key server 708. Alternatively, the communications between the drive 710 and the key server 708 may go through a device driver, operating system, file system or some other software on the host computer. After the drive 710 has received the key(s), it may then encrypt data being written to the media within the specified cartridge in accordance with the key(s).

In another embodiment, in which the encryption policy is stored with the cartridge, the library and/or drive reads the policy information directly from the cartridge and requests the key server 708 to provide the encryption key(s) required by the appropriate encryption policy to the drive 710. Since the policy is stored with the cartridge, the cartridge identifier may be implied and may not actually be stored or associated with the policy. In one embodiment, labels are printed, manufactured, or otherwise created to store the policy. The labels may comprise paper, plastic, metal, glass, or any other label material as is known to those of skill in the art. The labels may also comprise an integrated part of the cartridge. For example, the cartridge may be molded or manufactured with certain characteristics that are used to specify a policy. In another example, the cartridge may have an integrated machine readable electronic display that can be updated with different information that may be used to specify a policy. In another embodiment, the policy may be created through a user interface of the library, the drive, a host computer, the key server, or another computer coupled to the library. Once the policy has been defined for one or more cartridges, the policy is written to the cartridge. Writing of the policy refers to the combining of the policy information with the cartridge. The library, drive, or another apparatus may actually write the policy information to the cartridge. For example, if the cartridge memory is used to store the policy, the library may write the policy to the cartridge, or it may use the drive to write the policy to the cartridge. In the case where a label is used to identify the cartridge policy, the policy may be written when the label is affixed to, imprinted on, or manufactured with the cartridge, as is known to those of skill in the art.

This invention has been described with the drive 710 initiating communications with the key server 708. It should be noted that the library may initiate communication with the key server. For example, if the library knows the policy for a particular drive, it may request the appropriate key from the key server and present the key to the drive. In this invention, references to transmit, transmits, transmitted, or transmitting refers to the transfer of information over an interface, or from one component, device, or object to another. In this invention, references to entering an encryption policy may refer to the selection, input, or creation of a policy. For example, an operator may enter a policy at a user interface of a library. In another example, a policy may be entered when a label is printed, manufactured, or otherwise created.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for encrypting data on a removable media cartridge.

What is claimed is:

1. A system for selective encryption of data in a data storage drive within a data storage library, comprising:
   a user interface through which to receive a user input of one or more encryption policies, each encryption policy including a level of encryption, one or more cartridge identifiers, each cartridge identifier providing an encryption key representing a data cartridge stored in the library, and each cartridge identifier providing an identification of an encryption key to be used to encrypt data written to media in a data cartridge;
   at least one hardware processor device configured to:
   obtain a cartridge identifier of a data cartridge loaded into the storage drive;
   read one or more identifiers selected from the group comprising a bar code label affixed to the loaded data cartridge, a non-bar code machine readable label affixed to the loaded data cartridge, a value stored on media within the loaded data cartridge, a value stored within a cartridge memory of the loaded data cartridge, and an RFID tag affixed to the loaded data cartridge; and match the cartridge identifier with an associated encryption policy stored in the storage drive, the matching of the cartridge identifier with the associated encryption policy being performed at the storage drive; and a library-drive interface configured to:

transmit a request to a key server for an encryption key in response to matching the cartridge identifier with a corresponding encryption policy; and receive the requested encryption key from the key server; and an encryption controller to encrypt data to be written to the loaded data cartridge, where data stored in the data storage library is selectively encrypted.

2. The system of claim 1, further comprising a memory for storing the one or more encryption policies in an encryption policy table, wherein selecting an encryption policy for the specified data cartridge is performed by the storage drive.

3. A method for selective encryption of data in a storage drive within a data storage library, comprising:

receiving a user input of one or more encryption policies, the one or more encryption policies being stored in a memory of a library-drive interface, each encryption policy including a level of encryption, one or more cartridge identifiers, each cartridge identifier representing a data cartridge stored in the library, and each cartridge identifier providing an identification of an encryption key to be used to encrypt data written to media in a data cartridge;

obtaining a cartridge identifier of a data cartridge loaded into the storage drive;

reading one or more identifiers selected from the group comprising a bar code label affixed to the loaded data cartridge, a non-bar code machine readable label affixed to the loaded data cartridge, a value stored on media within the loaded data cartridge, a value stored within a cartridge memory of the loaded data cartridge, and an RFID tag affixed to the loaded data cartridge;

matching the cartridge identifier with an associated encryption policy stored in the storage drive, the matching of the cartridge identifier with the associated encryption policy being performed at the storage drive; and using the library-drive interface to:

transmit a request to a key server for an encryption key in response to matching the cartridge identifier with a corresponding encryption policy; and receive the requested encryption key from the key server; and encrypting data to be written to the loaded data cartridge, where data stored in the data storage library is selectively encrypted.

4. The method of claim 3, further comprising storing the one or more encryption policies in an encryption policy table, wherein selecting an encryption policy for the specified data cartridge is performed by the storage drive.

5. A computer program product for selective encryption of data in a storage drive within a data storage library using a processing device, the computer program product embodied on a non-transitory computer-readable storage medium having computer-readable program code portions stored therein, the computer-readable program code portions comprising:

computer code for receiving a user input of one or more encryption policies, the one or more encryption policies being stored in a memory of a library-drive interface, each encryption policy including a level of encryption, one or more cartridge identifiers, each cartridge identifier providing an encryption key representing a data cartridge stored in the library, and each cartridge identifier providing an identification of an encryption key to be used to encrypt data written to media in a data cartridge;

computer code for obtaining a cartridge identifier of a data cartridge loaded into the storage drive;

computer code for reading one or more identifiers selected from the group comprising a bar code label affixed to the loaded data cartridge, a non-bar code machine readable label affixed to the loaded data cartridge, a value stored on media within the loaded data cartridge, a value stored within a cartridge memory of the loaded data cartridge, and an RFID tag affixed to the loaded data cartridge;

computer code for matching the cartridge identifier with an associated encryption policy stored in the storage drive, the matching of the cartridge identifier with the associated encryption policy being performed at the storage drive; and computer code for using the library-drive interface to:

transmit a request to a key server for an encryption key in response to matching the cartridge identifier with a corresponding encryption policy; and receive the requested encryption key from the key server; and computer code for encrypting data to be written to the loaded data cartridge, where data stored in the data storage library is selectively encrypted.

6. The computer program product of claim 5, further comprising computer code for storing the one or more encryption policies in an encryption policy table, wherein selecting an encryption policy for the specified data cartridge is performed by the storage drive.

* * * * *